(12) United States Patent
Galor

(10) Patent No.: US 9,122,311 B2
(45) Date of Patent: Sep. 1, 2015

(54) VISUAL FEEDBACK FOR TACTILE AND NON-TACTILE USER INTERFACES

(75) Inventor: Micha Galor, Tel Aviv, IL (US)

(73) Assignee: APPLE INC., Cupertino, CA (US)

( * ) Notice: Subject to any disclaimer, the term of this patent is extended or adjusted under 35 U.S.C. 154(b) by 328 days.

(21) Appl. No.: 13/592,369

(22) Filed: Aug. 23, 2012

(65) Prior Publication Data

US 2013/0055150 A1 Feb. 28, 2013

Related U.S. Application Data

(60) Provisional application No. 61/526,696, filed on Aug. 24, 2011.

(51) Int. Cl.
G06F 3/0485 (2013.01)
G06F 3/01 (2006.01)
G09G 5/34 (2006.01)

(52) U.S. Cl.
CPC .............. G06F 3/017 (2013.01); G06F 3/0485 (2013.01); G09G 5/34 (2013.01); G06F 2203/04806 (2013.01)

(58) Field of Classification Search
CPC ....................................................... G06F 3/017
USPC .......................................... 345/157; 715/784
See application file for complete search history.

(56) References Cited

U.S. PATENT DOCUMENTS

| | | |
|---|---|---|
| 4,550,250 A | 10/1985 | Mueller et al. |
| 4,789,921 A | 12/1988 | Aho |
| 4,988,981 A | 1/1991 | Zimmerman et al. |
| 5,495,576 A | 2/1996 | Ritchey |
| 5,588,139 A | 12/1996 | Lanier et al. |
| 5,594,469 A | 1/1997 | Freeman et al. |
| 5,846,134 A | 12/1998 | Latypov |
| 5,852,672 A | 12/1998 | Lu |
| 5,862,256 A | 1/1999 | Zetts et al. |
| 5,864,635 A | 1/1999 | Zetts et al. |
| 5,870,196 A | 2/1999 | Lulli et al. |
| 5,917,937 A | 6/1999 | Szeliski et al. |
| 5,973,700 A | 10/1999 | Taylor et al. |
| 6,002,808 A | 12/1999 | Freeman |
| 6,084,979 A | 7/2000 | Kanade et al. |
| 6,243,054 B1 | 6/2001 | DeLuca |
| 6,252,988 B1 | 6/2001 | Ho |

(Continued)

FOREIGN PATENT DOCUMENTS

| | | |
|---|---|---|
| WO | 9935633 A2 | 7/1999 |
| WO | 03071410 A2 | 8/2003 |

(Continued)

OTHER PUBLICATIONS

Virtual Reality-Augmented Rehabilitation for Patients Following Stroke by Merians et. al. Phys Ther. 2002; 82:898-91.*

(Continued)

*Primary Examiner* — William Bashore
*Assistant Examiner* — Nathan Shrewsbury
(74) *Attorney, Agent, or Firm* — D. Kligler I.P. Services Ltd.

(57) ABSTRACT

A method, including presenting, by a computer, a scrollable list of interactive items on a display driven by the computer, and receiving an input from a user of the computer. The list is scrolled at a speed indicated by the input, and the list is zoomed in response to the speed of the scrolling.

11 Claims, 8 Drawing Sheets

(56) References Cited

U.S. PATENT DOCUMENTS

| | | |
|---|---|---|
| 6,256,033 B1 | 7/2001 | Nguyen |
| 6,262,740 B1 | 7/2001 | Lauer et al. |
| 6,345,111 B1 | 2/2002 | Yamaguchi et al. |
| 6,345,893 B2 | 2/2002 | Fateh et al. |
| 6,452,584 B1 | 9/2002 | Walker et al. |
| 6,456,262 B1 | 9/2002 | Bell |
| 6,507,353 B1 | 1/2003 | Huard et al. |
| 6,512,838 B1 | 1/2003 | Rafii et al. |
| 6,519,363 B1 | 2/2003 | Su et al. |
| 6,559,813 B1 | 5/2003 | DeLuca et al. |
| 6,681,031 B2 | 1/2004 | Cohen et al. |
| 6,686,921 B1 | 2/2004 | Rushmeier et al. |
| 6,690,370 B2 | 2/2004 | Ellenby et al. |
| 6,741,251 B2 | 5/2004 | Malzbender |
| 6,791,540 B1 | 9/2004 | Baumberg |
| 6,803,928 B2 | 10/2004 | Bimber et al. |
| 6,853,935 B2 | 2/2005 | Satoh et al. |
| 6,857,746 B2 | 2/2005 | Dyner |
| 6,977,654 B2 | 12/2005 | Malik et al. |
| 7,003,134 B1 | 2/2006 | Covell et al. |
| 7,013,046 B2 | 3/2006 | Kawamura et al. |
| 7,023,436 B2 | 4/2006 | Segawa et al. |
| 7,042,440 B2 | 5/2006 | Pryor et al. |
| 7,042,442 B1 | 5/2006 | Kanevsky et al. |
| 7,151,530 B2 | 12/2006 | Roeber et al. |
| 7,170,492 B2 | 1/2007 | Bell |
| 7,215,815 B2 | 5/2007 | Honda |
| 7,227,526 B2 | 6/2007 | Hildreth et al. |
| 7,259,747 B2 | 8/2007 | Bell |
| 7,264,554 B2 | 9/2007 | Bentley |
| 7,289,227 B2 | 10/2007 | Smetak et al. |
| 7,301,648 B2 | 11/2007 | Foxlin |
| 7,302,099 B2 | 11/2007 | Zhang et al. |
| 7,333,113 B2 | 2/2008 | Gordon |
| 7,340,077 B2 | 3/2008 | Gokturk |
| 7,348,963 B2 | 3/2008 | Bell |
| 7,358,972 B2 | 4/2008 | Gordon et al. |
| 7,370,883 B2 | 5/2008 | Basir et al. |
| 7,427,996 B2 | 9/2008 | Yonezawa et al. |
| 7,428,542 B1 | 9/2008 | Fink et al. |
| 7,474,256 B2 | 1/2009 | Ohta et al. |
| 7,526,120 B2 | 4/2009 | Gokturk et al. |
| 7,536,032 B2 | 5/2009 | Bell |
| 7,573,480 B2 | 8/2009 | Gordon |
| 7,576,727 B2 | 8/2009 | Bell |
| 7,580,572 B2 | 8/2009 | Bang et al. |
| 7,590,941 B2 | 9/2009 | Wee et al. |
| 7,688,998 B2 | 3/2010 | Tuma et al. |
| 7,696,876 B2 | 4/2010 | Dimmer et al. |
| 7,724,250 B2 | 5/2010 | Ishii et al. |
| 7,762,665 B2 | 7/2010 | Vertegaal et al. |
| 7,774,155 B2 | 8/2010 | Sato et al. |
| 7,812,842 B2 | 10/2010 | Gordon |
| 7,821,541 B2 | 10/2010 | Delean |
| 7,840,031 B2 | 11/2010 | Albertson et al. |
| 7,844,914 B2 | 11/2010 | Andre et al. |
| 7,925,549 B2 | 4/2011 | Looney et al. |
| 7,971,156 B2 | 6/2011 | Albertson et al. |
| 8,166,421 B2 | 4/2012 | Magal et al. |
| 8,368,647 B2 | 2/2013 | Lin |
| 8,514,221 B2 | 8/2013 | King et al. |
| 2002/0057383 A1 | 5/2002 | Iwamura |
| 2002/0071607 A1 | 6/2002 | Kawamura et al. |
| 2002/0158873 A1 | 10/2002 | Williamson |
| 2003/0057972 A1 | 3/2003 | Pfaff et al. |
| 2003/0063775 A1 | 4/2003 | Rafii et al. |
| 2003/0088463 A1 | 5/2003 | Kanevsky |
| 2003/0156756 A1 | 8/2003 | Gokturk et al. |
| 2003/0185444 A1 | 10/2003 | Honda |
| 2003/0235341 A1 | 12/2003 | Gokturk et al. |
| 2004/0046744 A1 | 3/2004 | Rafii et al. |
| 2004/0104935 A1 | 6/2004 | Williamson |
| 2004/0135744 A1 | 7/2004 | Bimber et al. |
| 2004/0174770 A1 | 9/2004 | Rees |
| 2004/0183775 A1 | 9/2004 | Bell |
| 2004/0184640 A1 | 9/2004 | Bang et al. |
| 2004/0184659 A1 | 9/2004 | Bang et al. |
| 2004/0258314 A1 | 12/2004 | Hashimoto |
| 2005/0031166 A1 | 2/2005 | Fujimura et al. |
| 2005/0088407 A1 | 4/2005 | Bell et al. |
| 2005/0089194 A1 | 4/2005 | Bell |
| 2005/0110964 A1 | 5/2005 | Bell et al. |
| 2005/0122308 A1 | 6/2005 | Bell et al. |
| 2005/0162381 A1 | 7/2005 | Bell et al. |
| 2005/0190972 A1 | 9/2005 | Thomas et al. |
| 2005/0254726 A1 | 11/2005 | Fuchs et al. |
| 2005/0265583 A1 | 12/2005 | Covell et al. |
| 2006/0010400 A1 | 1/2006 | Dehlin et al. |
| 2006/0092138 A1 | 5/2006 | Kim et al. |
| 2006/0110008 A1 | 5/2006 | Vertegaal et al. |
| 2006/0115155 A1 | 6/2006 | Lui et al. |
| 2006/0139314 A1 | 6/2006 | Bell |
| 2006/0149737 A1 | 7/2006 | Du et al. |
| 2006/0159344 A1 | 7/2006 | Shao et al. |
| 2006/0187196 A1 | 8/2006 | Underkoffler et al. |
| 2006/0239670 A1 | 10/2006 | Cleveland |
| 2006/0248475 A1 | 11/2006 | Abrahamsson |
| 2007/0078552 A1 | 4/2007 | Rosenberg |
| 2007/0154116 A1 | 7/2007 | Shieh |
| 2007/0230789 A1 | 10/2007 | Chang et al. |
| 2008/0062123 A1 | 3/2008 | Bell |
| 2008/0094371 A1 | 4/2008 | Forstall et al. |
| 2008/0123940 A1 | 5/2008 | Kundu et al. |
| 2008/0150890 A1 | 6/2008 | Bell et al. |
| 2008/0150913 A1 | 6/2008 | Bell et al. |
| 2008/0170776 A1 | 7/2008 | Albertson et al. |
| 2008/0222558 A1* | 9/2008 | Cho et al. ............... 715/784 |
| 2008/0236902 A1 | 10/2008 | Imaizumi |
| 2008/0252596 A1 | 10/2008 | Bell et al. |
| 2008/0256494 A1 | 10/2008 | Greenfield |
| 2008/0260250 A1 | 10/2008 | Vardi |
| 2008/0287189 A1 | 11/2008 | Rabin |
| 2009/0009593 A1 | 1/2009 | Cameron et al. |
| 2009/0027335 A1 | 1/2009 | Ye |
| 2009/0027337 A1 | 1/2009 | Hildreth |
| 2009/0031240 A1 | 1/2009 | Hildreth |
| 2009/0040215 A1 | 2/2009 | Afzulpurkar et al. |
| 2009/0077504 A1 | 3/2009 | Bell et al. |
| 2009/0078473 A1 | 3/2009 | Overgard et al. |
| 2009/0083122 A1 | 3/2009 | Angell et al. |
| 2009/0083622 A1 | 3/2009 | Chien et al. |
| 2009/0096783 A1 | 4/2009 | Shpunt et al. |
| 2009/0183125 A1 | 7/2009 | Magal et al. |
| 2009/0195392 A1 | 8/2009 | Zalewski |
| 2009/0228841 A1 | 9/2009 | Hildreth |
| 2009/0256817 A1 | 10/2009 | Perlin et al. |
| 2009/0297028 A1 | 12/2009 | De Haan |
| 2010/0002936 A1 | 1/2010 | Khomo |
| 2010/0007717 A1 | 1/2010 | Spektor et al. |
| 2010/0034457 A1 | 2/2010 | Berliner et al. |
| 2010/0036717 A1 | 2/2010 | Trest |
| 2010/0053151 A1 | 3/2010 | Marti et al. |
| 2010/0071965 A1 | 3/2010 | Hu et al. |
| 2010/0149096 A1 | 6/2010 | Migos et al. |
| 2010/0164897 A1 | 7/2010 | Morin et al. |
| 2010/0177933 A1 | 7/2010 | Willmann et al. |
| 2010/0199228 A1 | 8/2010 | Latta et al. |
| 2010/0234094 A1 | 9/2010 | Gagner et al. |
| 2010/0235786 A1 | 9/2010 | Maizels et al. |
| 2011/0006978 A1 | 1/2011 | Yuan |
| 2011/0018795 A1 | 1/2011 | Jang |
| 2011/0029918 A1 | 2/2011 | Yoo et al. |
| 2011/0052006 A1 | 3/2011 | Gurman et al. |
| 2011/0081072 A1 | 4/2011 | Kawasaki et al. |
| 2011/0164032 A1 | 7/2011 | Shadmi |
| 2011/0164141 A1 | 7/2011 | Tico et al. |
| 2011/0185309 A1* | 7/2011 | Challinor et al. ......... 715/784 |
| 2011/0193939 A1 | 8/2011 | Vassigh et al. |
| 2011/0202834 A1* | 8/2011 | Mandryk et al. ......... 715/701 |
| 2011/0211754 A1 | 9/2011 | Litvak et al. |
| 2011/0225536 A1 | 9/2011 | Shams et al. |
| 2011/0227820 A1 | 9/2011 | Haddick et al. |
| 2011/0231757 A1 | 9/2011 | Haddick et al. |
| 2011/0248914 A1 | 10/2011 | Sherr |

(56) References Cited

U.S. PATENT DOCUMENTS

| | | | |
|---|---|---|---|
| 2011/0254765 A1 | 10/2011 | Brand | |
| 2011/0254798 A1 | 10/2011 | Adamson et al. | |
| 2011/0260965 A1 | 10/2011 | Kim et al. | |
| 2011/0261058 A1 | 10/2011 | Luo | |
| 2011/0279397 A1 | 11/2011 | Rimon et al. | |
| 2011/0291926 A1 | 12/2011 | Gokturk et al. | |
| 2011/0292036 A1 | 12/2011 | Sali et al. | |
| 2011/0293137 A1 | 12/2011 | Gurman et al. | |
| 2011/0310010 A1 | 12/2011 | Hoffnung et al. | |
| 2012/0001875 A1 | 1/2012 | Li et al. | |
| 2012/0078614 A1 | 3/2012 | Galor et al. | |
| 2012/0169583 A1 | 7/2012 | Rippel et al. | |
| 2012/0202569 A1 | 8/2012 | Maizels et al. | |
| 2012/0204133 A1 | 8/2012 | Guendelman et al. | |
| 2012/0223882 A1 | 9/2012 | Galor et al. | |
| 2012/0313848 A1 | 12/2012 | Galor et al. | |
| 2013/0014052 A1 | 1/2013 | Frey et al. | |
| 2013/0044053 A1 | 2/2013 | Galor et al. | |
| 2013/0055120 A1 | 2/2013 | Galor et al. | |
| 2013/0055150 A1 | 2/2013 | Galor | |
| 2013/0058565 A1 | 3/2013 | Rafii et al. | |
| 2013/0106692 A1 | 5/2013 | Maizels et al. | |
| 2013/0107021 A1 | 5/2013 | Maizels et al. | |
| 2013/0155070 A1 | 6/2013 | Luo | |
| 2013/0207920 A1 | 8/2013 | McCann et al. | |
| 2013/0260884 A1* | 10/2013 | Challinor et al. | 463/31 |
| 2014/0152604 A1* | 6/2014 | Westerman et al. | 345/173 |

FOREIGN PATENT DOCUMENTS

| | | | |
|---|---|---|---|
| WO | 2004107272 A1 | 12/2004 | |
| WO | 2005003948 A1 | 1/2005 | |
| WO | 2005094958 A1 | 10/2005 | |
| WO | 2007043036 A1 | 4/2007 | |
| WO | 2007078639 A1 | 7/2007 | |
| WO | 2007105205 A2 | 9/2007 | |
| WO | 2007132451 A2 | 11/2007 | |
| WO | 2007135376 A2 | 11/2007 | |
| WO | 2008120217 A2 | 10/2008 | |
| WO | 2012011044 A1 | 1/2012 | |
| WO | 2012020380 A1 | 2/2012 | |
| WO | 2012107892 A1 | 8/2012 | |

OTHER PUBLICATIONS

Kinect in cancer surgery—AboutKidsHealth.ca as of (Mar. 28, 2011).*

Miller, R., "Kinect for XBox 360 Review", Engadget, Nov. 4, 2010.

U.S. Appl. No. 13/161,508 Office Action dated Sep. 9, 2013.

International Application PCT/IB2013/052332 Search Report dated Aug. 26, 2013.

U.S. Appl. No. 13/314,210 Office Action dated Jul. 19, 2013.

U.S. Appl. No. 13/314,207 Office Action dated Aug. 5, 2013.

Hart, D., U.S. Appl. No. 09/616,606 "Method and System for High Resolution, Ultra Fast 3-D Imaging" filed Jul. 14, 2000.

International Application PCT/IL2007/000306 Search Report dated Oct. 2, 2008.

International Application PCT/IL2007/000574 Search Report dated Sep. 10, 2008.

International Application PCT/IL2006/000335 Preliminary Report on Patentability dated Apr. 24, 2008.

Avidan et al., "Trajectory triangulation: 3D reconstruction of moving points from amonocular image sequence", IEEE Transactions on Pattern Analysis and Machine Intelligence (PAMI), vol. 22, No. 4, pp. 348-3537, Apr. 2000.

Leclerc et al., "The direct computation of height from shading", The Proceedings of the IEEE Computer Society Conference on Computer Vision and Pattern Recognition (CVPR), pp. 552-558, USA, Jun. 1991.

Zhang et al., "Shape from intensity gradient", IEEE Transactions on Systems, Man and Cybernetics—Part A: Systems and Humans, vol. 29, No. 3, pp. 318-325, May 1999.

Zhang et al., "Height recovery from intensity gradients", IEEE Computer Society Conference on Computer Vision and Pattern Recognition (CVPR), pp. 508-513, Jun. 21-23, 1994.

Horn, B., "Height and gradient from shading", International Journal of Computer Vision, vol. 5, No. 1, pp. 37-76, Aug. 1990.

Bruckstein, A., "On shape from shading", Computer Vision, Graphics & Image Processing, vol. 44, pp. 139-154, year 1988.

Zhang et al., "Rapid Shape Acquisition Using Color Structured Light and Multi-Pass Dynamic Programming", 1st International Symposium on 3D Data Processing Visualization and Transmission (3DPVT), Italy, Jul. 2002.

Besl, P., "Active, Optical Range Imaging Sensors", Machine vision and applications, vol. 1, pp. 127-152, year 1988.

Horn et al., "Toward optimal structured light patterns", Proceedings of International Conference on Recent Advances in 3D Digital Imaging and Modeling, pp. 28-37, Ottawa, Canada, May 1997.

Goodman, J.W., "Statistical Properties of Laser Speckle Patterns", Laser Speckle and Related Phenomena, pp. 9-75, Springer-Verlag, Berlin Heidelberg, 1975.

Asada et al., "Determining Surface Orientation by Projecting a Stripe Pattern", IEEE Transactions on Pattern Analysis and Machine Intelligence (PAMI), vol. 10, No. 5, pp. 749-754, Sep. 1988.

Winkelbach et al., "Shape from Single Stripe Pattern Illumination", Luc Van Gool (Editor), (DAGM 2002), Lecture Notes in Computer Science 2449, p. 240-247, Springer 2002.

Koninckx et al., "Efficient, Active 3D Acquisition, based on a Pattern-Specific Snake", Luc Van Gool (Editor), (DAGM 2002), Lecture Notes in Computer Science 2449, pp. 557-565, Springer 2002.

Kimmel et al., "Analyzing and synthesizing images by evolving curves with the Osher-Sethian method", International Journal of Computer Vision, vol. 24, No. 1, pp. 37-56, year 1997.

Zigelman et al., "Texture mapping using surface flattening via multidimensional scaling", IEEE Transactions on Visualization and Computer Graphics, vol. 8, No. 2, pp. 198-207, Apr. 2002.

Dainty, J.C., "Introduction", Laser Speckle and Related Phenomena, pp. 1-7, Springer-Verlag, Berlin Heidelberg, 1975.

Mendlovic et al., "Composite harmonic filters for scale, projection and shift invariant pattern recognition", Applied Optics Journal, vol. 34, No. 2, Jan. 10, 1995.

Fua et al., "Human Shape and Motion Recovery Using Animation Models", 19th Congress, International Society for Photogrammetry and Remote Sensing, Amsterdam, The Netherlands, Jul. 2000.

Allard et al., "Marker-less Real Time 3D modeling for Virtual Reality", Immersive Projection Technology, Iowa State University, year 2004.

Howe et al., "Bayesian Reconstruction of 3D Human Motion from Single-Camera Video", Advanced in Neural Information Processing Systems, vol. 12, pp. 820-826, USA 1999.

Li et al., "Real-Time 3D Motion Tracking with Known Geometric Models", Real-Time Imaging Journal, vol. 5, pp. 167-187, Academic Press 1999.

Grammalidis et al., "3-D Human Body Tracking from Depth Images Using Analysis by Synthesis", Proceedings of the IEEE International Conference on Image Processing (ICIP2001), pp. 185-188, Greece, Oct. 7-10, 2001.

Segen et al., "Shadow gestures: 3D hand pose estimation using a single camera", Proceedings of IEEE International Conference on Computer Vision and Pattern Recognition, pp. 479-485, Fort Collins, USA, 1999.

Vogler et al., "ASL recognition based on a coupling between HMMs and 3D motion analysis", Proceedings of IEEE International Conference on Computer Vision, pp. 363-369, Mumbai, India, 1998.

Nam et al., "Recognition of Hand Gestures with 3D, Nonlinear Arm Movements", Pattern Recognition Letters, vol. 18, No. 1, pp. 105-113, Elsevier Science B.V. 1997.

Nesbat, S., "A System for Fast, Full-Text Entry for Small Electronic Devices", Proceedings of the 5th International Conference on Multimodal Interfaces, ICMI 2003, Vancouver, Nov. 5-7, 2003.

Ascension Technology Corporation, "Flock of Birds: Real-Time Motion Tracking", 2008.

(56) References Cited

OTHER PUBLICATIONS

Segen et al., "Human-computer interaction using gesture recognition and 3D hand tracking", ICIP 98, Proceedings of the IEEE International Conference on Image Processing, vol. 3, pp. 188-192, Oct. 4-7, 1998.
Dekker, L., "Building Symbolic Information for 3D Human Body Modeling from Range Data", Proceedings of the Second International Conference on 3D Digital Imaging and Modeling, IEEE computer Society, pp. 388-397, 1999.
Holte et al., "Gesture Recognition using a Range Camera", Technical Report CVMT-07-01 ISSN 1601-3646, Feb. 2007.
Cheng et al., "Articulated Human Body Pose Inference from Voxel Data Using a Kinematically Constrained Gaussian Mixture Model", CVPR EHuM2: 2nd Workshop on Evaluation of Articulated Human Motion and Pose Estimation, 2007.
Microvision Inc., "PicoP® Display Engine—How it Works", 1996-2012.
Primesense Corporation, "PrimeSensor Nite 1.1", USA, year 2010.
Arm Ltd., "AMBA Specification: AHB", Version 2, pp. 35-92, year 1999.
Commission Regulation (EC) No. 1275/2008, Official Journal of the European Union, Dec. 17, 2008.
Primesense, "Natural Interaction", YouTube Presentation, Jun. 9, 2010 http://www.youtube.com/watch?v=TzLKsex43zl~.
Manning et al., "Foundations of Statistical Natural Language Processing", chapters 6,7,9 and 12, MIT Press 1999.
U.S. Appl. No. 12/762,336 Official Action dated May 15, 2012.
Tobii Technology, "The World Leader in Eye Tracking and Gaze Interaction", Mar. 2012.
Noveron, "Madison video eyewear", year 2012.
International Application PCT/IB2012/050577 Search Report dated Aug. 6, 2012.
U.S. Appl. No. 12/683,452 Official Action dated Sep. 7, 2012.
Koutek, M., "Scientific Visualization in Virtual Reality: Interaction Techniques and Application Development", PhD Thesis, Delft University of Technology, 264 pages, Jan. 2003.
Azuma et al., "Recent Advances in Augmented Reality", IEEE Computer Graphics and Applications, vol. 21, issue 6, pp. 34-47, Nov. 2001.
Breen et al., "Interactive Occlusion and Collision of Real and Virtual Objects in Augmented Reality", Technical Report ECRC-95-02, ECRC, Munich, Germany, 22 pages, year 1995.
Burdea et al., "A Distributed Virtual Environment with Dextrous Force Feedback", Proceedings of Interface to Real and Virtual Worlds Conference, pp. 255-265, Mar. 1992.
Sun et al., "SRP Based Natural Interaction Between Real and Virtual Worlds in Augmented Reality", Proceedings of the International Conference on Cyberworlds (CW'08), pp. 117-124, Sep. 22-24, 2008.
Schmalstieg et al., "The Studierstube Augmented Reality Project", Presence: Teleoperators and Virtual Environments, vol. 11, No. 1, pp. 33-54, Feb. 2002.
Ohta et al., "Share-Z: Client/Server Depth Sensing for See-Through Head-Mounted Displays", Presence: Teleoperators and Virtual Environments, vol. 11, No. 2, pp. 176-188, Apr. 2002.
Gobbetti et al., "VB2: an Architecture for Interaction in Synthetic Worlds", Proceedings of the 6th Annual ACM Symposium on User Interface Software and Technology (UIST'93), pp. 167-178, Nov. 3-5, 1993.
Gargallo et al., "Bayesian 3D Modeling from Images Using Multiple Depth Maps", Proceedings of the IEEE Computer Society Conference on Computer Vision and Pattern Recognition (CVPR'05), vol. 2, pp. 885-891, Jun. 20-25, 2005.
U.S. Appl. No. 13/541,786, filed Jul. 5, 2012.
U.S. Appl. No. 61/652,899, filed May 30, 2012.
U.S. Appl. No. 13/244,490 Office Action dated Dec. 6, 2013.
U.S. Appl. No. 13/423,314 Office Action dated Dec. 4, 2013.
U.S. Appl. No. 13/423,322 Office Action dated Nov. 1, 2013.

Bleiwess et al., "Fusing Time-of-Flight Depth and Color for Real-Time Segmentation and Tracking", Dyn3D 2009, Lecture Notes in Computer Science 5742, pp. 58-69, Jena, Germany, Sep. 9, 2009.
Bleiwess et al., "Markerless Motion Capture Using a Single Depth Sensor", SIGGRAPH Asia 2009, Yokohama, Japan, Dec. 16-19, 2009.
Bevilacqua et al., "People Tracking Using a Time-Of-Flight Depth Sensor", Proceedings of the IEEE International Conference on Video and Signal Based Surveillance, Sydney, Australia, Nov. 22-24, 2006.
Bradski, G., "Computer Vision Face Tracking for Use in a Perceptual User Interface", Intel Technology Journal, vol. 2, issue 2 (2nd Quarter 2008).
Comaniciu et al., "Kernel-Based Object Tracking", IEEE Transactions on Pattern Analysis and Machine Intelligence, vol. 25, No. 5, pp. 564-577, May 2003.
Gesturetec Inc., "Gesture Control Solutions for Consumer Devices", Canada, 2009.
Gokturk et al., "A Time-Of-Flight Depth Sensor—System Description, Issues and Solutions", Proceedings of the 2004 Conference on Computer Vision and Patter Recognition Workshop (CVPRW'04), vol. 3, pp. 35, Jun. 27-Jul. 2, 2004.
Grest et al., "Single View Motion Tracking by Depth and Silhouette Information", SCIA 2007—Scandinavian Conference on Image Analysis, Lecture Notes in Computer Science 4522, pp. 719-729, Aalborg, Denmark, Jun. 10-14, 2007.
Haritaoglu et al., "Ghost 3d: Detecting Body Posture and Parts Using Stereo", Proceedings of the IEEE Workshop on Motion and Video Computing (Motion'02), pp. 175-180, Orlando, USA, Dec. 5-6, 2002.
Haritaoglu et al., "W4S : A real-time system for detecting and tracking people in 2<1/2>D", ECCV 98—5th European conference on computer vision, vol. 1407, pp. 877-892, Freiburg , Germany, Jun. 2-6, 1998.
Harville, M., "Stereo Person Tracking with Short and Long Term Plan-View Appearance Models of Shape and Color", Proceedings of the IEEE International Conference on Advanced Video and Signal-Based Surveillance (AVSSS-2005), pp. 522-527, Como, Italy, Sep. 15-16, 2005.
Holte, M., "Fusion of Range and Intensity Information for View Invariant Gesture Recognition", IEEE Conference on Computer Vision and Pattern Recognition Workshops (CVPRW '08), pp. 1-7, Anchorage, USA, Jun. 23-28, 2008.
Kaewtrakulpong et al., "An Improved Adaptive Background Mixture Model for Real-Time Tracking with Shadow Detection", Proceedings of the 2nd European Workshop on Advanced Video Based Surveillance Systems (AVBS'01), Kingston, UK, Sep. 2001.
Kolb et al., "ToF-Sensors: New Dimensions for Realism and Interactivity", Proceedings of the IEEE Conference on Computer Vision and Patter Recognition Workshops, pp. 1-6, Anchorage, USA, Jun. 23-28, 2008.
Kolsch et al., "Fast 2D Hand Tracking with Flocks of Features and Multi-Cue Integration", IEEE Workshop on Real-Time Time Vision for Human Computer Interaction (at CVPR'04), Washington, USA, Jun. 27-Jul. 2, 2004.
Krumm et al., "Multi-Camera Multi-Person Tracking for EasyLiving", 3rd IEEE International Workshop on Visual Surveillance, Dublin, Ireland, Jul. 1, 2000.
Leens et al., "Combining Color, Depth, and Motion for Video Segmentation", ICVS 2009—7th International Conference on Computer Vision Systems, Liege, Belgium Oct. 13-15, 2009.
MacCormick et al., "Partitioned Sampling, Articulated Objects, and Interface-Quality Hand Tracking", ECCV '00—Proceedings of the 6th European Conference on Computer Vision-Part II , pp. 3-19, Dublin, Ireland, Jun. 26-Jul. 1, 2000.
Malassiotis et al., "Real-Time Hand Posture Recognition Using Range Data", Image and Vision Computing, vol. 26, No. 7, pp. 1027-1037, Jul. 2, 2008.
Morano et al., "Structured Light Using Pseudorandom Codes", IEEE Transactions on Pattern Analysis and Machine Intelligence, vol. 20, issue 3, pp. 322-327, Mar. 1998.
Munoz-Salinas et al., "People Detection and Tracking Using Stereo Vision and Color", Image and Vision Computing, vol. 25, No. 6, pp. 995-1007, Jun. 1, 2007.

(56) References Cited

OTHER PUBLICATIONS

Nanda et al., "Visual Tracking Using Depth Data", Proceedings of the 2004 Conference on Computer Vision and Patter Recognition Workshop, vol. 3, Washington, USA, Jun. 27-Jul. 2, 2004.
Scharstein et al., "High-Accuracy Stereo Depth Maps Using Structured Light", IEEE Conference on Computer Vision and Patter Recognition, vol. 1, pp. 195-2002, Madison, USA, Jun. 2003.
Shi et al., "Good Features to Track", IEEE Conference on Computer Vision and Pattern Recognition, pp. 593-600, Seattle, USA, Jun. 21-23, 1994.
Siddiqui et al., "Robust Real-Time Upper Body Limb Detection and Tracking", Proceedings of the 4th ACM International Workshop on Video Surveillance and Sensor Networks, Santa Barbara, USA, Oct. 27, 2006.
Softkinetic S.A., IISU™-3D Gesture Recognition Platform for Developers of 3D Applications, Belgium, Brussels, 2007-2010.
Sudderth et al., "Visual Hand Tracking Using Nonparametric Belief Propagation", IEEE Workshop on Generative Model Based Vision at CVPR'04, Washington, USA, Jun. 27-Jul. 2, 2004.
Tsap, L., "Gesture-Tracking in Real Time with Dynamic Regional Range Computation", Real-Time Imaging, vol. 8, issue 2, pp. 115-126, Apr. 2002.
Xu et al., "A Multi-Cue-Based Human Body Tracking System", Proceedings of the 5ths International Conference on Computer Vision Systems (ICVS 2007), Germany, Mar. 21-24, 2007.
Xu et al., "Human Detecting Using Depth and Gray Images", Proceedings of the IEE Conference on Advanced Video and Signal Based Surveillance (AVSS'03), Miami, USA, Jul. 21-22, 2003.
Yilmaz et al., "Object Tracking: A Survey", ACM Computing Surveys, vol. 38, No. 4, article 13, Dec. 2006.
Zhu et al., "Controlled Human Pose Estimation From Depth Image Streams", IEEE Conference on Computer Vision and Patter Recognition Workshops, pp. 1-8, Anchorage, USA, Jun. 23-27, 2008.
International Application PCT/IB2010/051055 Search Report dated Sep. 1, 2010.
La Viola, J. Jr., "Whole-Hand and Speech Input in Virtual Environments", Computer Science Department, Florida Atlantic University, USA, 1996.
Martell, C., "Form: An Experiment in the Annotation of the Kinematics of Gesture", Dissertation, Computer and Information Science, University of Pennsylvania, 2005.
U.S. Appl. No. 12/352,622 Official Action dated Mar. 31, 2011.
Prime Sense Inc., "Prime SensorTM NITE 1.1 Framework Programmer's Guide", Version 1.2, year 2009.
Primesense Corporation, "PrimeSensor Reference Design 1.08", USA, year 2010.
U.S. Appl. No. 13/592,352, filed Aug. 23, 2012.
U.S. Appl. No. 61/615,403, filed Mar. 26, 2012.
U.S. Appl. No. 61/603,949, filed Feb. 28, 2012.
U.S. Appl. No. 61/525,771, filed Aug. 21, 2011.
U.S. Appl. No. 61/663,638, filed Jun. 25, 2012.
U.S. Appl. No. 61/538,970, filed Sep. 26, 2011.
U.S. Appl. No. 13/584,831, filed Aug. 14, 2012.
International Application PCT/IB2011/053192 Search Report dated Dec. 6, 2011.
U.S. Appl. No. 13/314,210, filed Dec. 8, 2011.
U.S. Appl. No. 12/352,622 Official Action dated Sep. 30, 2011.
Gordon et al., "The use of Dense Stereo Range Date in Augmented Reality", Proceedings of the 1st International Symposium on Mixed and Augmented Reality (ISMAR), Darmstadt, Germany, pp. 1-10, Sep. 30-Oct. 1, 2002.
Agrawala et al., "The two-user Responsive Workbench :support for collaboration through individual views of a shared space", Proceedings on the 24th conference on computer graphics and interactive techniques (SIGGRAPH 97), Los Angeles, USA, pp. 327-332, Aug. 3-8, 1997.
Harman et al., "Rapid 2D-to 3D conversion", Proceedings of SPIE Conference on Stereoscopic Displays and Virtual Reality Systems, vol. 4660, pp. 78-86, Jan. 21-23, 2002.
Hoff et al., "Analysis of head pose accuracy in augmented reality", IEEE Transactions on Visualization and Computer Graphics, vol. 6, No. 4, pp. 319-334, Oct.-Dec. 2000.
Poupyrev et al., "The go-go interaction technique: non-liner mapping for direct manipulation in VR", Proceedings of the 9th annual ACM Symposium on User interface software and technology (UIST '96), Washington, USA, pp. 79-80, Nov. 6-8, 1996.
Wexelblat et al., "Virtual Reality Applications and Explorations", Academic Press Inc., San Diego, USA, 262 pages, year 1993.
U.S. Appl. No. 13/161,508 Office Action dated Apr. 10, 2013.
U.S. Appl. No. 12/683,452 Office Action dated Jun. 7, 2013.
Galor, M., U.S. Appl. No. 13/778,172 "Asymmetric Mapping in Tactile and Non-Tactile User Interfaces" filed Feb. 27, 2013.
Berenson et al., U.S. Appl. No. 13/904,050 "Zoom-based gesture user interface" filed May 29, 2013.
Berenson et al., U.S. Appl. No. 13/904,052 "Gesture-based interface with enhanced features" filed May 29, 2013.
Bychkov et al., U.S. Appl. No. 13/849,514 "Gaze-enhanced Virtual Touchscreen" filed Mar. 24, 2013.
Guendelman et al., U.S. Appl. No. 13/849,514 "Enhanced Virtual Touchpad" filed Mar. 24, 2013.

* cited by examiner

VISUAL FEEDBACK FOR TACTILE AND NON-TACTILE USER INTERFACES

CROSS-REFERENCE TO RELATED APPLICATIONS

This application claims the benefit of U.S. Provisional Patent Application 61/526,696 filed on Aug. 24, 2011, which is incorporated herein by reference.

FIELD OF THE INVENTION

This invention relates generally to user interfaces for computerized systems, and specifically to user interfaces that are based on three-dimensional sensing.

BACKGROUND OF THE INVENTION

Many different types of user interface devices and methods are currently available. Common tactile interface devices include the computer keyboard, mouse and joystick. Touch screens detect the presence and location of a touch by a finger or other object within the display area. Infrared remote controls are widely used, and "wearable" hardware devices have been developed, as well, for purposes of remote control.

Computer interfaces based on three-dimensional (3D) sensing of parts of the user's body have also been proposed. For example, PCT International Publication WO 03/071410, whose disclosure is incorporated herein by reference, describes a gesture recognition system using depth-perceptive sensors. A 3D sensor provides position information, which is used to identify gestures created by a body part of interest. The gestures are recognized based on a shape of a body part and its position and orientation over an interval. The gesture is classified for determining an input into a related electronic device.

As another example, U.S. Pat. No. 7,348,963, whose disclosure is incorporated herein by reference, describes an interactive video display system, in which a display screen displays a visual image, and a camera captures 3D information regarding an object in an interactive area located in front of the display screen. A computer system directs the display screen to change the visual image in response to changes in the object.

Three-dimensional human interface systems may identify not only the user's hands, but also other parts of the body, including the head, torso and limbs. For example, U.S. Patent Application Publication 2010/0034457, whose disclosure is incorporated herein by reference, describes a method for modeling humanoid forms from depth maps. The depth map is segmented so as to find a contour of the body. The contour is processed in order to identify a torso and one or more limbs of the subject. An input is generated to control an application program running on a computer by analyzing a disposition of at least one of the identified limbs in the depth map.

Documents incorporated by reference in the present patent application are to be considered an integral part of the application except that to the extent any terms are defined in these incorporated documents in a manner that conflicts with the definitions made explicitly or implicitly in the present specification, only the definitions in the present specification should be considered.

The description above is presented as a general overview of related art in this field and should not be construed as an admission that any of the information it contains constitutes prior art against the present patent application.

SUMMARY OF THE INVENTION

There is provided, in accordance with an embodiment of the present invention a method including presenting, by a computer, a scrollable list of interactive items on a display driven by the computer, receiving an input from a user of the computer, scrolling the list at a speed indicated by the input, and zooming the list in response to the speed of the scrolling.

There is also provided, in accordance with an embodiment of the present invention a method including presenting, by a computer, a scrollable list of items on a display driven by the computer, receiving, from a depth sensor, a sequence of three-dimensional (3D) maps containing at least a hand of a user of the computer, defining a swipe region in space in proximity to the user, detecting, in the sequence of maps, a swipe gesture performed by the hand, in which the hand engages the swipe region at a first location in space and then disengages from the swipe region at a second location in space, initiating a scrolling of the list at a speed set in response to the engagement of the swipe region by the hand performing the swipe gesture, and after the disengagement of the swipe region by the hand performing the swipe gesture, gradually decelerating the speed of the scrolling of the list.

There is additionally provided, in accordance with an embodiment of the present invention a method including presenting, by a computer, multiple interactive items on a display driven by the computer, receiving, from a depth sensor, a sequence of three-dimensional (3D) maps containing at least a hand of a user of the computer, detecting, in the maps, a select gesture hand performed by the hand and directed toward one of the multiple interactive items, and distorting a region on the display containing the one of the multiple interactive items in response to the select gesture.

There is further provided, in accordance with an embodiment of the present invention an apparatus including a display, and a computer configured to present a scrollable list of interactive items on the display, to receive an input from a user of the computer, to scroll the list at a speed indicated by the input, and to zoom the list in response to the speed of the scrolling.

There is also provided, in accordance with an embodiment of the present invention an apparatus including a depth sensor, and a computer configured to present a scrollable list of items on a display driven by the computer, to receive, from the depth sensor, a sequence of three-dimensional (3D) maps containing at least a hand of a user of the computer, to define a swipe region in space in proximity to the user, to detect, in the sequence of maps, a swipe gesture performed by the hand, in which the hand engages the swipe region at a first location in space and then disengages from the swipe region at a second location in space, to initiate a scrolling of the list at a speed set in response to the engagement of the swipe region by the hand performing the swipe gesture, and after the disengagement of the swipe region by the hand performing the swipe gesture, to gradually decelerate the speed of the scrolling of the list.

There is additionally provided, in accordance with an embodiment of the present invention an apparatus including a depth sensor, and a computer configured to present multiple interactive items on a display driven by the computer, to receive, from the depth sensor, a sequence of three-dimensional (3D) maps containing at least a hand of a user of the computer, to detect, in the maps, a select gesture hand performed by the hand and directed toward one of the multiple interactive items, and to distort a region on the display containing the one of the multiple interactive items in response to the select gesture.

There is further provided, in accordance with an embodiment of the present invention a computer software product including a non-transitory computer-readable medium, in which program instructions are stored, which instructions, when read by a computer, cause the computer to present a scrollable list of interactive items on a display driven by the computer, to receive an input from a user of the computer, to scroll the list at a speed indicated by the input, and to zoom the list in response to the speed of the scrolling.

There is also provided, in accordance with an embodiment of the present invention a computer software product including a non-transitory computer-readable medium, in which program instructions are stored, which instructions, when read by a computer, cause the computer to present a scrollable list of items on a display driven by the computer, to receive, from a depth sensor, a sequence of three-dimensional (3D) maps containing at least a hand of a user of the computer, to define a swipe region in space in proximity to the user, to detect, in the sequence of maps, a swipe gesture performed by the hand, in which the hand engages the swipe region at a first location in space and then disengages from the swipe region at a second location in space, to initiate a scrolling of the list at a speed set in response to the engagement of the swipe region by the hand performing the swipe gesture, and after the disengagement of the swipe region by the hand performing the swipe gesture, to gradually decelerate the speed of the scrolling of the list.

There is further provided, in accordance with an embodiment of the present invention a computer software product including a non-transitory computer-readable medium, in which program instructions are stored, which instructions, when read by a computer, cause the computer to present a scrollable list of items on a display driven by the computer, to receive, from a depth sensor, a sequence of three-dimensional (3D) maps containing at least a hand of a user of the computer, to detect, in the maps, a select gesture hand performed by the hand and directed toward one of the multiple interactive items, and to distort a region on a display containing the one of the multiple interactive items in response to the select gesture.

BRIEF DESCRIPTION OF THE DRAWINGS

The disclosure is herein described, by way of example only, with reference to the accompanying drawings, wherein.

DETAILED DESCRIPTION OF EMBODIMENTS

When using a tactile input device such as a mouse, the user typically manipulates the physical device in a two-dimensional plane comprising a horizontal X-axis and a vertical Y-axis. However, when interacting with a non-tactile 3D user interface (also referred to herein as a 3D user interface), the user may perform gestures in mid-air, and perform the gestures from different positions within a field of view of a 3D sensor coupled to the interface.

Embodiments of the present invention provide methods and systems for a computer executing a 3D user interface to convey "friction-like" feedback in response to a gesture performed by a user. In some embodiments, the computer may present, on a display, a list of items that can be scrolled horizontally or vertically. The list can be presented on the display as a circular "wheel", where the items are positioned along the wheel's outer rim, and the first element of the list appears immediately after the last element.

Using gestures such as Swipe, Grab and Release gestures described hereinbelow, the user can scroll the list in a direction of the user's hand performing the gesture. In some embodiments, the computer can determine a speed of the hand performing the gesture, and adjust the scrolling speed of the list accordingly. In additional embodiments, the computer can present the scrollable list at a size corresponding to the scrolling speed. For example, the computer can reduce the size of the presented scrollable list at higher scrolling speeds, and increase the size of the presented scrollable list at lower scrolling speeds, thereby enhancing the readability of the scrollable list.

Embodiments of the present invention also provide methods and systems for the computer to convey visual feedback as the user moves his hand along a depth axis toward the display. As explained in detail hereinbelow, an interaction surface can be defined in space in proximity to the user, and the computer can be configured to responsively execute control instructions upon a part of the user's body crossing the interaction surface. In some embodiments, a hand-shaped cursor can be presented as a reflection on the display, and the presented size of the hand cursor can be inversely proportional to a distance between the user's hand and the interaction surface. In other words, the computer can increase the size of the hand cursor as the user's hand moves along the depth axis toward the interaction surface.

In additional embodiments, the computer may present visual distortion as the user's hand moves forward and crosses the interaction surface. In some embodiments, the distortion may comprise presenting a region surrounding the hand-shaped cursor with an "elastic-like" effect, and the region on the display can be presented as a recessed vertex upon the user's hand crossing the interaction region.

System Description

Figure 1:
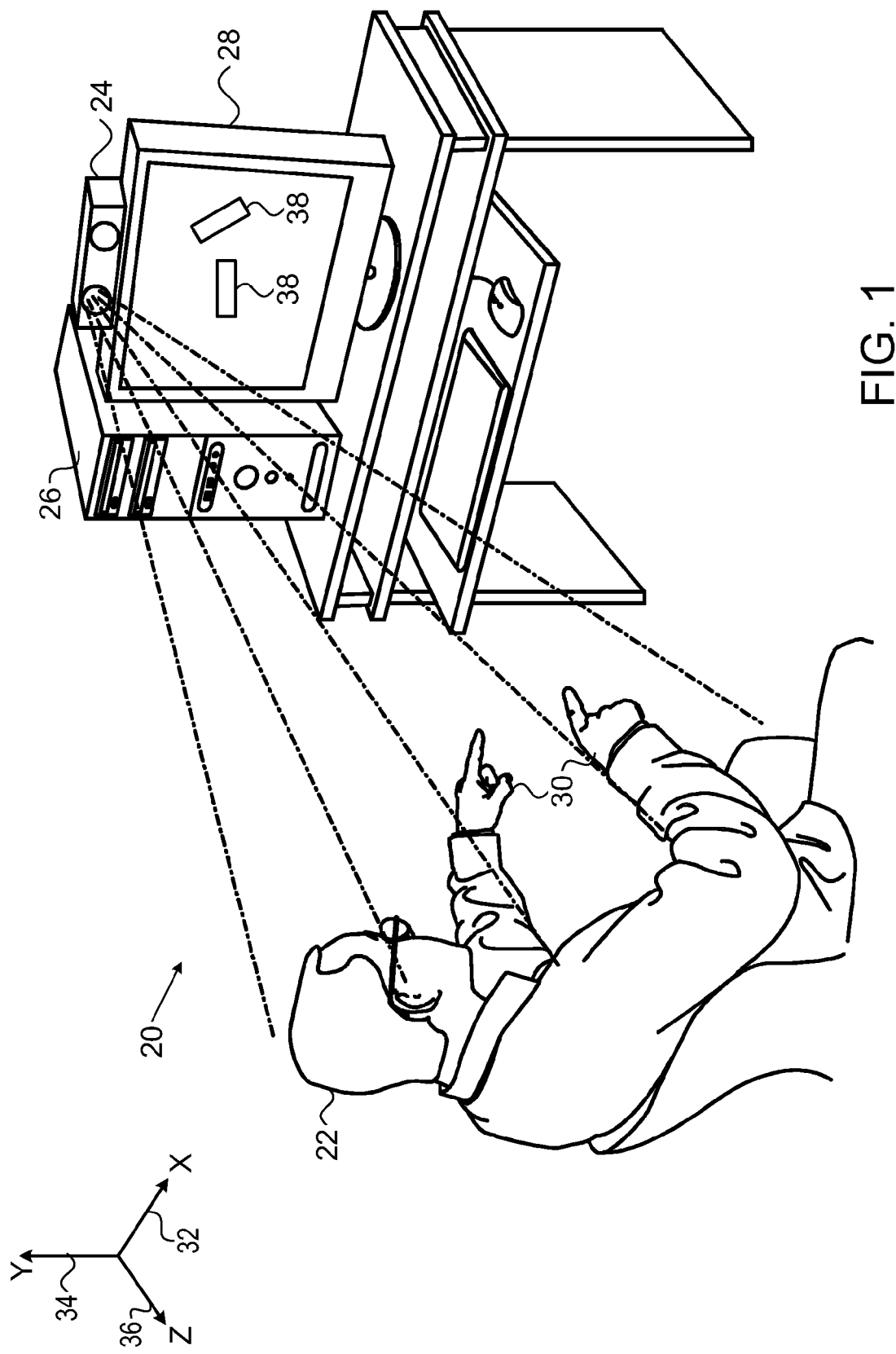
FIG. 1 is a schematic, pictorial illustration of a computer system implementing a gesture-based three dimensional (3D) user interface with visual feedback, in accordance with an embodiment of the present invention.

FIG. 1 is a schematic, pictorial illustration of a non-tactile three dimensional (3D) user interface 20 for operation by a user 22 of a computer 26, in accordance with an embodiment of the present invention. The 3D user interface is based on a 3D sensing device 24 (also referred to herein as a depth sensor) coupled to the computer, which captures 3D scene information of a scene that includes the body (or at least a body part, such as one or more of hands 30) of the user. Device 24 or a separate camera (not shown in the figures) may also capture video images of the scene. The information captured by device 24 is processed by computer 26, which drives a display 28 so as to present and manipulate on-screen interactive items 38. Details of the operation of 3D sensing device 24 are described in U.S. Patent Application 2010/0007717, filed on Mar. 4, 2009, whose disclosure is incorporated herein by reference.

Computer 26, executing 3D user interface 20, processes data generated by device 24 in order to reconstruct a 3D map of user 22. The term "3D map" refers to a set of 3D coordinates measured, by way of example, with reference to a generally horizontal X-axis 32 in space, a generally vertical Y-axis 34 in space and a depth Z-axis 36 in space, based on device 24. The 3D coordinates represent the surface of a given object, in this case the user's body. In one embodiment, device 24 projects a pattern of spots onto the object and captures an image of the projected pattern. Computer 26 then computes the 3D coordinates of points on the surface of the user's body by triangulation, based on transverse shifts of the spots in the pattern. Methods and devices for this sort of triangulation-based 3D mapping using a projected pattern are described, for example, in PCT International Publications WO 2007/043036, WO 2007/105205 and WO 2008/120217, whose disclosures are incorporated herein by reference. Alternatively, interface 20 may use other methods of 3D mapping, using single or multiple cameras or other types of sensors, as are known in the art.

Computer 26 typically comprises a general-purpose computer processor, which is programmed in software to carry out the functions described hereinbelow. The software may be downloaded to the processor in electronic form, over a network, for example, or it may alternatively be provided on non-transitory tangible media, such as optical, magnetic, or electronic memory media. Alternatively or additionally, some or all of the functions of the image processor may be implemented in dedicated hardware, such as a custom or semi-custom integrated circuit or a programmable digital signal processor (DSP). Although computer 26 is shown in FIG. 1, by way of example, as a separate unit from sensing device 24, some or all of the processing functions of the computer may be performed by suitable dedicated circuitry within the housing of the sensing device or otherwise associated with the sensing device.

As another alternative, these processing functions may be carried out by a suitable processor that is integrated with display 28 (in a television set, for example) or with any other suitable sort of computerized device, such as a game console or media player. The sensing functions of device 24 may likewise be integrated into the computer or other computerized apparatus that is to be controlled by the sensor output.

Various techniques may be used to reconstruct the 3D map of the body of user 22. In one embodiment, computer 26 extracts 3D connected components corresponding to the parts of the body from the depth data generated by device 24. Techniques that may be used for this purpose are described, for example, in U.S. patent application Ser. No. 12/854,187, filed Aug. 11, 2010, whose disclosure is incorporated herein by reference. The computer analyzes these extracted components in order to reconstruct a "skeleton" of the user's body, as described in the above-mentioned U.S. Patent Application Publication 2010/0034457, or in U.S. patent application Ser. No. 12/854,188, filed Aug. 11, 2010, whose disclosure is also incorporated herein by reference. In alternative embodiments, other techniques may be used to identify certain parts of the user's body, and there is no need for the entire body to be visible to device 24 or for the skeleton to be reconstructed, in whole or even in part.

Using the reconstructed skeleton, computer 26 can assume a position of a body part such as a tip of a finger of hand 30, even though the body part (e.g., the fingertip) may not be detected by the depth map due to issues such as minimal object size and reduced resolution at greater distances from device 24. In some embodiments, computer 26 can auto-complete a body part based on an expected shape of the human part from an earlier detection of the body part, or from tracking the body part along several (previously) received depth maps.

In some embodiments, the information generated by computer 26 as a result of this skeleton reconstruction includes the location and direction of the user's head, as well as of the arms, torso, and possibly legs, hands and other features, as well. Changes in these features from frame to frame (i.e. depth maps) or in postures of the user can provide an indication of gestures and other motions made by the user. User posture, gestures and other motions may provide a control input for user interaction with interface 20. These body motions may be combined with other interaction modalities that are sensed by device 24, including user eye movements, as described above, as well as voice commands and other sounds. Interface 20 thus enables user 22 to perform various remote control functions and to interact with applications, interfaces, video programs, images, games and other multimedia content appearing on display 28.

Figure 2:
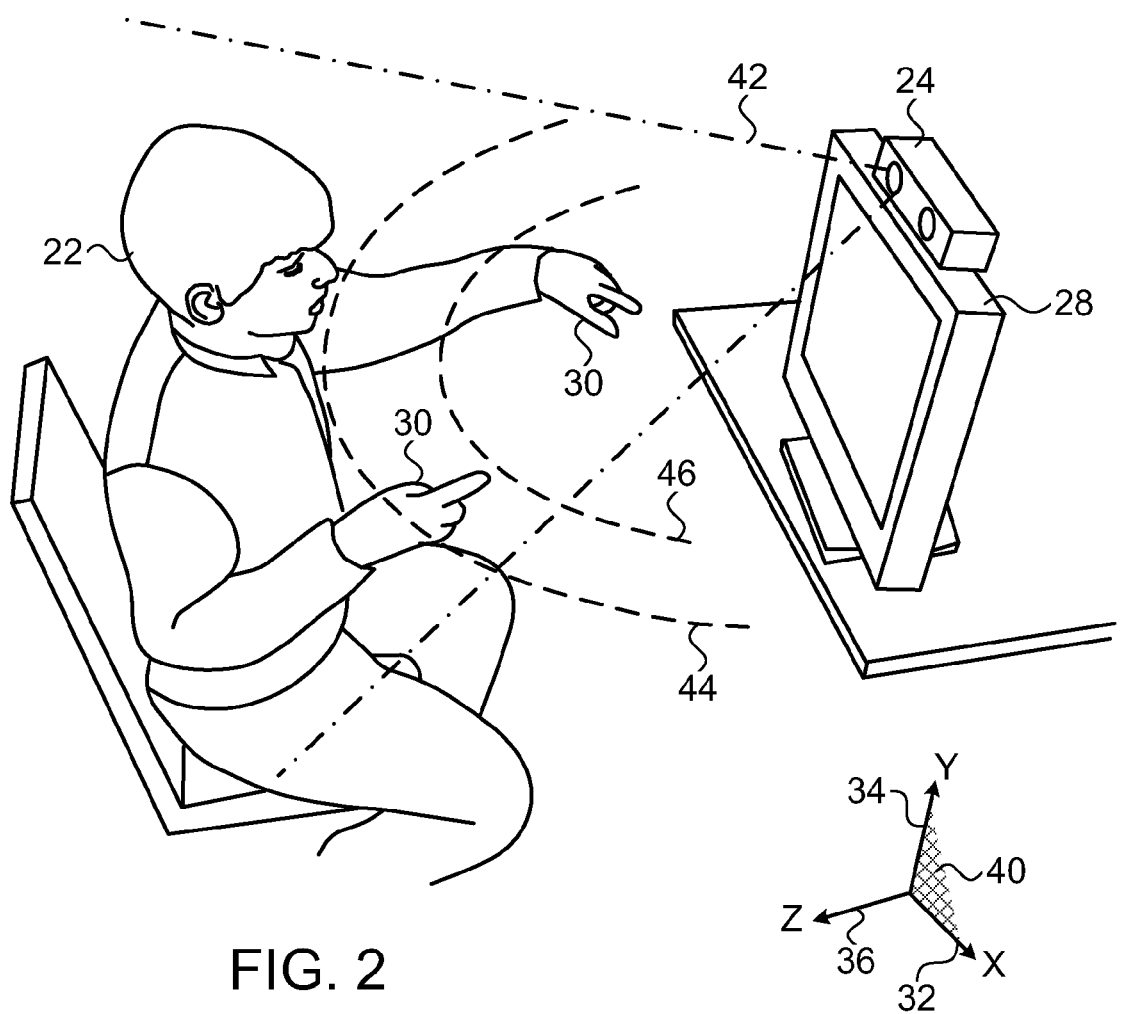
FIG. 2 is a schematic, pictorial illustration showing a user interacting with visualization and interaction regions associated with the 3D user interface, in accordance with an embodiment of the present invention.

FIG. 2 is a schematic, pictorial illustration showing how user 22 may interact with visualization and interaction regions associated with 3D user interface 20, in accordance with an embodiment of the present invention. For the purpose of this illustration, an X-Y plane 40 is taken to be parallel to the plane of display screen 28, with distance (depth) perpendicular to this plane corresponding to the Z-axis, and the origin located at device 24. Computer 26 creates a depth map of objects within a field of view 42 of device 24, including the parts of the user's body that are in the field of view.

The operation of 3D user interface 20 is based on an artificial division of the space within field of view 42 into a number of regions:

A visualization surface 44 defines the outer limit of a visualization region. Objects beyond this limit (such as the user's head in FIG. 2) are ignored by user interface 20. When a body part of the user is located within the visualization surface, the user interface detects it and provides visual feedback to the user regarding the location of that body part, typically in the form of an image or icon on display screen 28. In FIG. 2, both of the user's hands are in the visualization region.

An interaction surface 46, which is typically located within the visualization region, defines the outer limit of the interaction region. When a part of the user's body crosses the interaction surface, computer 26 can responsively execute control instructions, as would occur, for instance, if the user made physical contact with an actual touch screen. In this case, however, no physical contact is required to trigger the action. In the example shown in FIG. 2, the user's left hand has crossed the interaction surface and may thus interact with application objects.

The interaction and visualization surfaces may have any suitable shapes. In some embodiments, the inventors have found spherical surfaces to be convenient, as shown in FIG. 2. In alternative embodiments, one or both of the surfaces may be planar.

Various methods may be used to determine when a body part has crossed interaction surface 46 and where it is located. For simple tasks, static analysis of the 3D locations of points in the depth map of the body part may be sufficient. Alternatively, dynamic, velocity-based detection may provide more timely, reliable results, including prediction of and adaptation to user gestures as they occur. Thus, when a part of the user's body moves toward the interaction surface for a sufficiently long time, it is assumed to be located within the interaction region and may, in turn, result in objects being moved, resized or rotated, or otherwise controlled depending on the motion of the body part.

In operation, upon computer 26 detecting a given hand 30 between visualization surface 44 and display 28, the computer may responsively highlight a given interactive item 38 in response to the given hand's location. In instances where user 22 positions both hands 30 between visualization surface 44 and display 28, computer 26 may select the hand that is closer to the display as the given hand.

If user 22 wants to highlight a different interactive item 38, the user can perform a Find gesture, by moving hand 30 along X-Y plane 40. In some embodiments, computer 26 may highlight a given interactive item 38 by presenting a visual effect. For example, computer 26 can highlight the given interactive item by increasing the brightness of the given interactive item on display 28 or changing the color of the given interactive item. In alternative embodiments, computer 26 may highlight a given interactive item by presenting a cursor in proximity to the given interactive item. The Find gesture is described in U.S. patent application Ser. No. 13/314,207, filed on Dec. 8, 2011, whose disclosure is incorporated herein by reference.

Variable-Sized Scrollable Lists

Figure 3A:
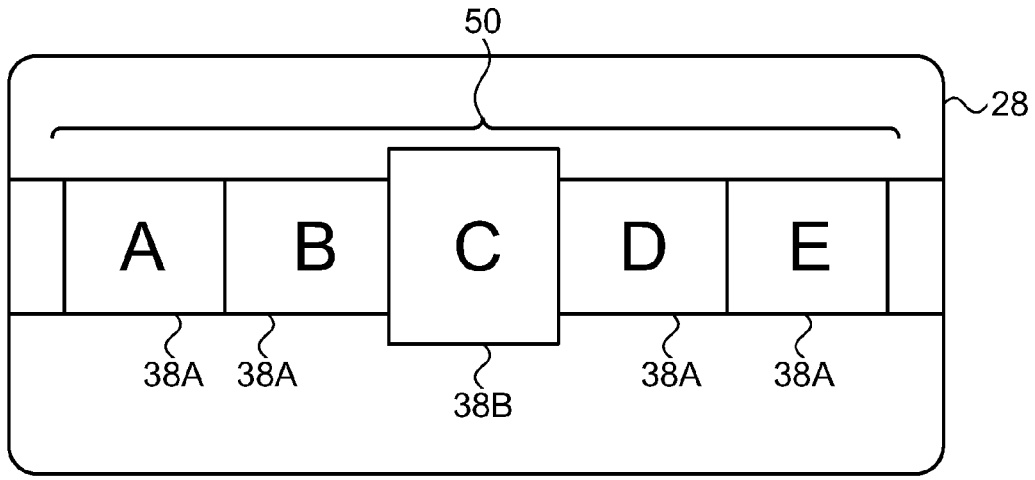
FIGS. 3A, 3B and 3C are schematic pictorial illustrations of the computer presenting a variable sized scrollable list on a display, in accordance with an embodiment of the present invention.
Figure 3B:
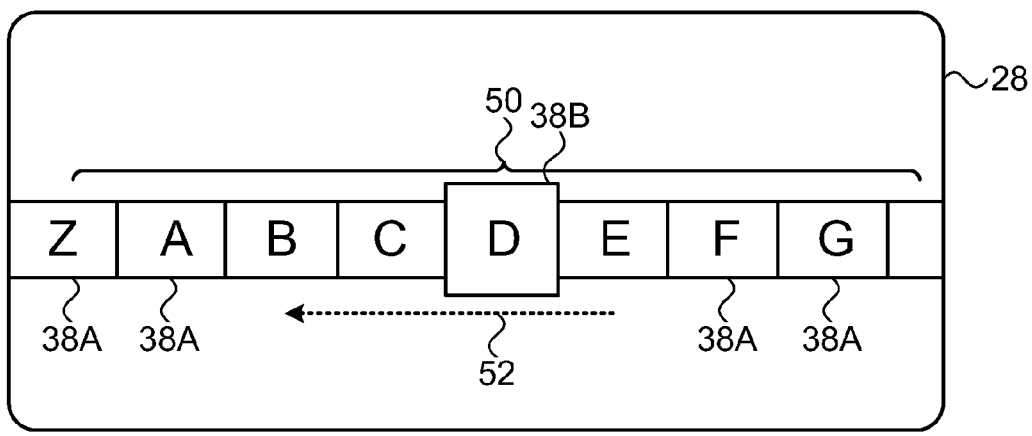
Figure 3C:
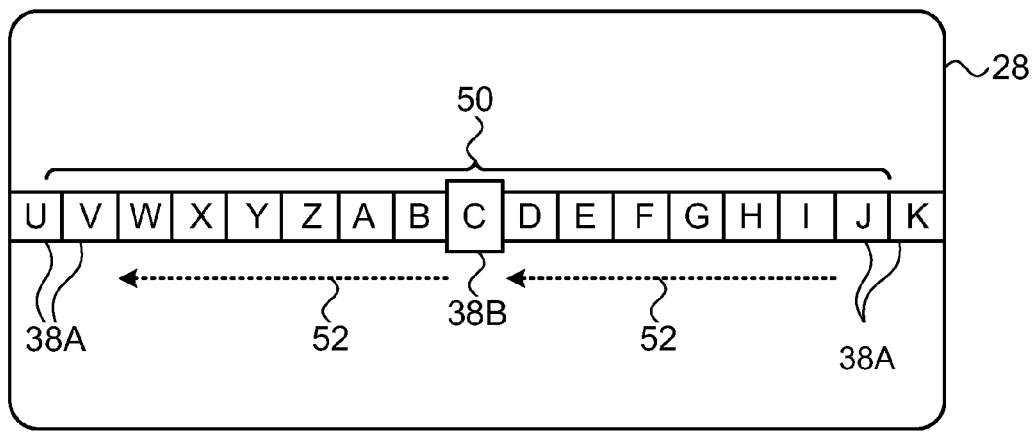

FIGS. 3A, 3B and 3C, referred to collectively as FIG. 3, are schematic pictorial illustrations of computer 26 presenting a variable-sized scrollable list 50 on display 28, in accordance with an embodiment of the present invention. In the description of FIG. 3 herein, some of interactive items 38 may be differentiated by appending a letter to the identifying numeral, so that list 50 comprises non-highlighted interactive items 38A and a highlighted interactive item 38B. In the example shown in FIG. 3, list 50 comprises 26 items "A"-"Z".

In some configurations, scrollable list 50 behaves like a wheel spinning on a (vertical) axle, where the non-highlighted and the highlighted items are positioned along the wheel's outer rim. As computer 26 scrolls list 50 in a direction indicated by arrows 52, the contents of highlighted item 38B changes, but the location of the highlighted item can remain constant. In the example shown in FIG. 3, if highlighted item 38B comprises "C", and computer 26 scrolls list 50 three items to the left, then the highlighted item changes to "F".

In some embodiments, computer 26 can present highlighted item 38B larger than non-highlighted items 38A. In alternative embodiments, computer 26 can convey other visual feedback in order to differentiate highlighted item 38B from the non-highlighted items. For example, computer 26 can present highlighted item 38B with different colors and/or with a greater luminance than the non-highlighted items.

Figure 4:
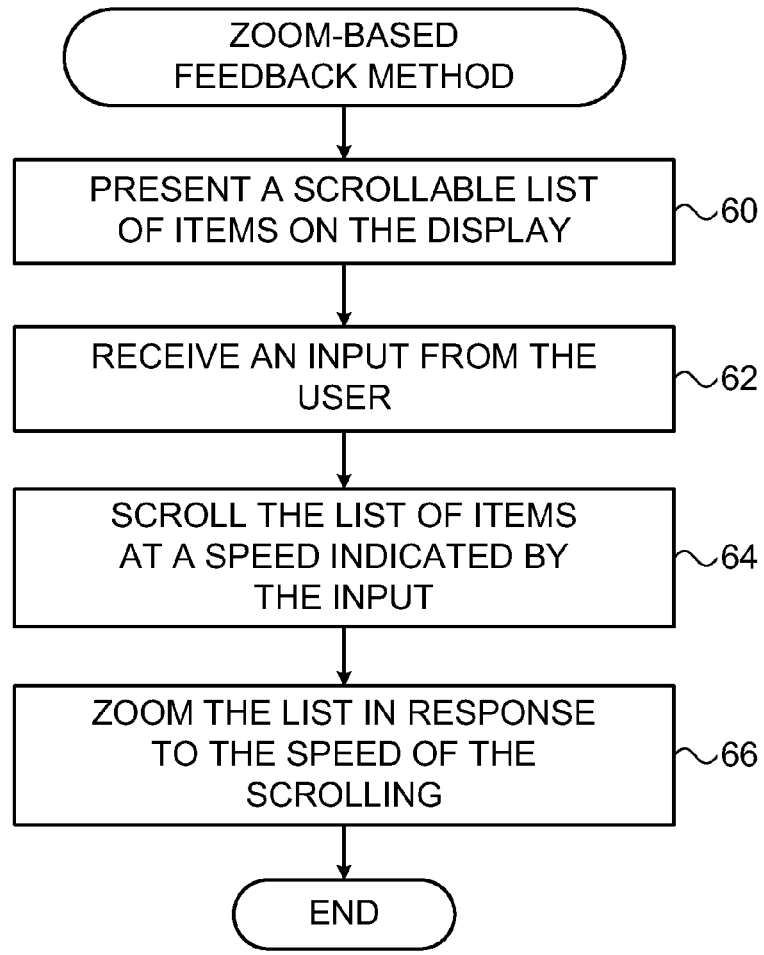
FIG. 4 is a flow diagram that schematically illustrates a method of conveying zoom-based feedback for the scrollable list, in accordance with an embodiment of the present invention.

FIG. 4 is a flow diagram that schematically illustrates a method of conveying zoom-based feedback for scrollable list 50, in accordance with an embodiment of the present invention. In an initial step 60, computer 26 presents scrollable list 50 on display 28, and in a receive step 62, the computer receives an input from user 22. In some embodiments, the input may comprise a sequence of 3D maps received from sensing device 24, and containing at least hand 30. For example, computer 26 may receive a sequence of maps and detect, in the maps, hand 30 performing a Swipe gesture (described in further detail hereinbelow). In alternative embodiments, the input may comprise a signal received from a tactile input device such as a keyboard or a mouse (not shown).

In a scroll step 64, computer 26 starts scrolling list 50 at a speed and in a direction indicated by the input. In embodiments where user 22 is interacting with computer 26 via 3D user interface 20, computer 26 can scroll the list (left or right) at different scrolling speeds corresponding to the speed and the direction of the hand performing a Swipe gesture.

In a zoom step 66, computer 26 zooms, i.e., either enlarges or reduces, scrollable list 50 in response to the scrolling speed, and the method ends. In some embodiments, computer 26 can present scrollable list 50 at a size inversely proportional to the scrolling speed. In other words, computer 26 can reduce the presented size of scrollable list 50 at higher scrolling speeds, and increase the presented size of the scrollable list at lower scrolling speeds.

In the example shown in FIG. 3, FIG. 3A shows computer 26 presenting list 50 at a large size, when the list has a low scrolling speed or is stationary, FIG. 3B shows the computer presenting the list at a medium size for a moderate scrolling speed, and FIG. 3C shows the computer presenting the list at a small size for a high scrolling speed.

Adjusting the presented size can enhance the readability of scrollable list 50 at higher scrolling speeds, thereby enhancing the user's experience. For example, computer 26 can present list 50 scrolling one item per second at the low scrolling speed, two items per second at the moderate scrolling speed, and three items per second at the high scrolling speed. Adjusting the size of scrollable list 50 can help enhance the readability of the list at the different scrolling speeds, since scrolling the list presented in FIG. 3A at three items per second can be difficult to read (i.e., "too fast") and scrolling the list presented in FIG. 3C at one frame per second can be slow and cumbersome (i.e., "too slow").

In some embodiments, as computer 26 scrolls list 50 at a scrolling speed equaling or surpassing a threshold and reduces the size of scrollable list 50, the computer may present an additional layer of information (not shown) either behind (i.e., the computer can present the list as slightly transparent), above or below the list. The additional layer may include information related to items 38A and 38B such as:
  If list 50 is sorted alphabetically, then the additional layer may comprise the first letter associated with items 38A and 38B. For example, if list 50 comprises a list of movies, the additional layer may comprise the first letters of the movies.
  If list 50 comprises a list of digital photographs, then the additional layer can comprise dates that the digital photographs were taken.

In some embodiments, computer 26 may present the additional layer either in proximity (i.e., behind, above or below, as described supra) to each item 38, or in proximity to every few items (e.g., behind every fourth item). Additionally or alternatively, computer 26 may present the additional layer scrolling at a slower speed than the scrolling speed of list 50. Computer 26 can create a visual effect known as "motion parallax" if the computer presents the additional layer behind list 50, and scrolls the additional layer at a slower speed (i.e., slower than the list).

Figure 5:
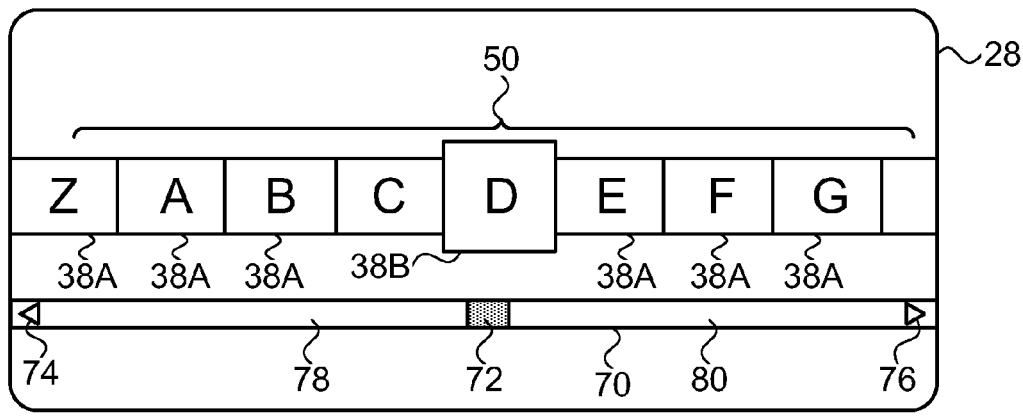
FIG. 5 is a schematic pictorial illustration of the computer presenting scrolling controls for the variable sized scrollable list, in accordance with an embodiment of the present invention.

FIG. 5 is a schematic pictorial illustration of computer 26 presenting scrolling controls for list 50, in accordance with an embodiment of the present invention. In the configuration shown in FIG. 5, computer 26 presents a scroll bar 70 that comprises a scroll box 72, a left scroll arrow 74, a right scroll arrow 76, a left tab region 78 and a right tab region 80.

Computer 26 can be configured to scroll list 50 in response to the input received from the user (i.e., in step 62 described supra). In some embodiments, the input may comprise a sequence of 3D maps received from sensing device 24, and computer 26 can scroll list 50 in response to detecting, in the maps, gestures directed toward scroll bar 70. Examples of gestures that user 22 can perform toward scroll bar 70 include, but are not limited to Touch and Grab gestures. The Touch gesture is described in U.S. patent application Ser. No. 13/423,314, filed on Mar. 19, 2012, whose disclosure is incorporated herein by reference, and comprises user 22 moving hand 30 toward display 28 and crossing interaction surface 46. The Grab gesture is also described in U.S. patent application Ser. No. 13/423,314, and comprises user 22 closing at least some fingers of hand 30.

In operation, computer 26 can be configured to:
- Scroll list 50 one item to the left upon detecting, in the maps, a Touch gesture directed toward left scroll arrow 74.
- Scroll list 50 one item to the right upon detecting, in the maps, a Touch gesture directed toward right scroll arrow 76.
- Scroll list 50 a specified number (e.g., four) of items to the left upon detecting, in the maps, a Touch gesture toward left tab region 78.
- Scroll list 50 a specified number of items to the right upon detecting, in the maps, a Touch gesture toward right tab region 80.
- Scroll list 50 in a direction indicated by a direction user 22 is moving hand 30 upon detecting in the maps, a Grab gesture directed toward scroll box 72 and hand 30 subsequently moving side-to-side along interaction surface 46.

In some embodiments, upon the 3D maps indicating user 22 performing a Grab gesture in order to manipulate scroll box 72 (i.e., by moving closed hand 30 side-to-side along interaction surface 46), computer 26 can scroll list 50 at a speed corresponding to a speed of the hand. As described supra, computer 26 can zoom list 50 in response to the scrolling speed (e.g., reduce the size of the list at faster scrolling speeds and increase the size of the list at slower scrolling speeds).

Swipe Gesture and Visual Friction Feedback

Figure 6:
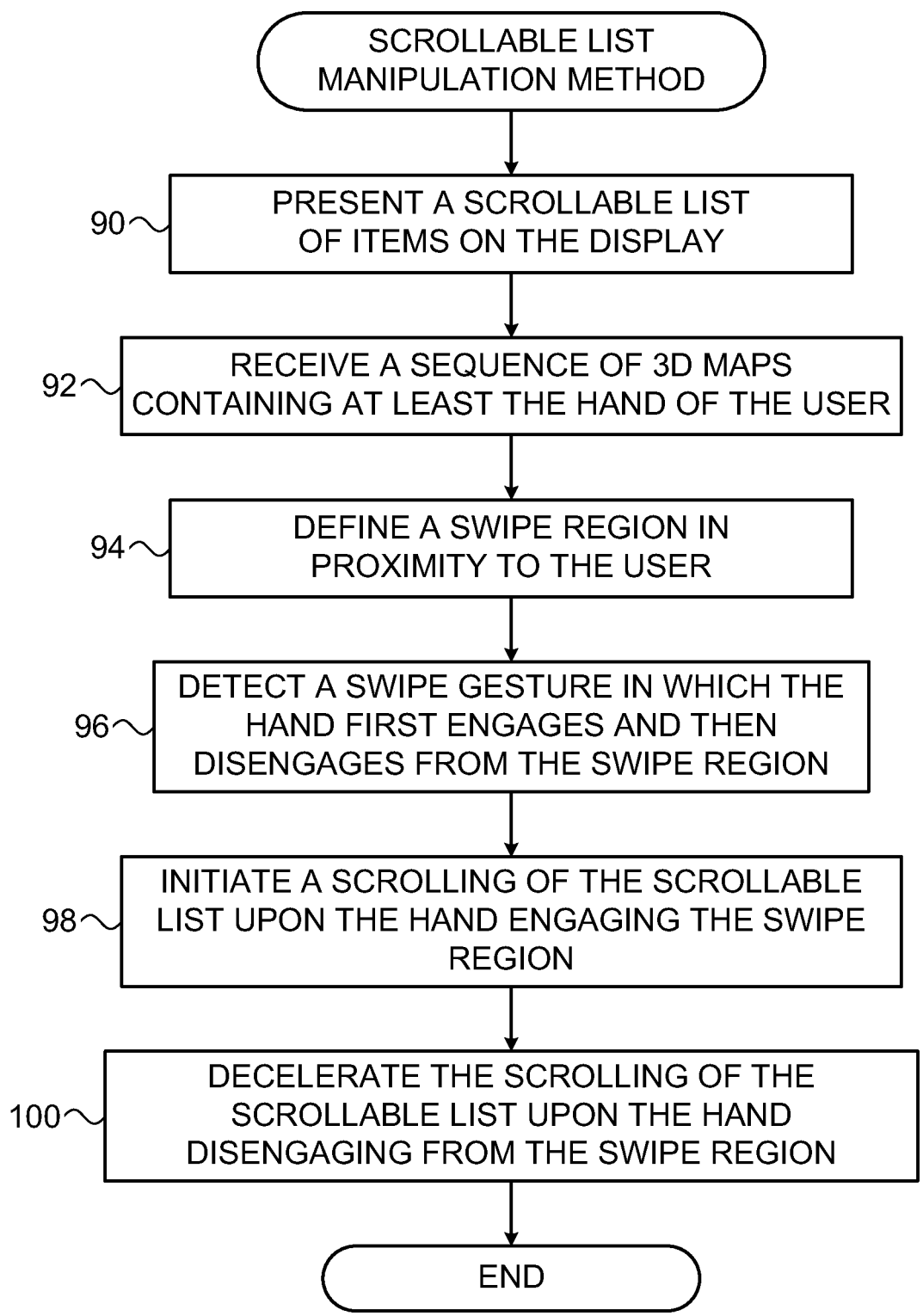
FIG. 6 is a flow diagram that schematically illustrates a method of manipulating the scrollable list via a swipe gesture, in accordance with an embodiment of the present invention.
Figure 7:
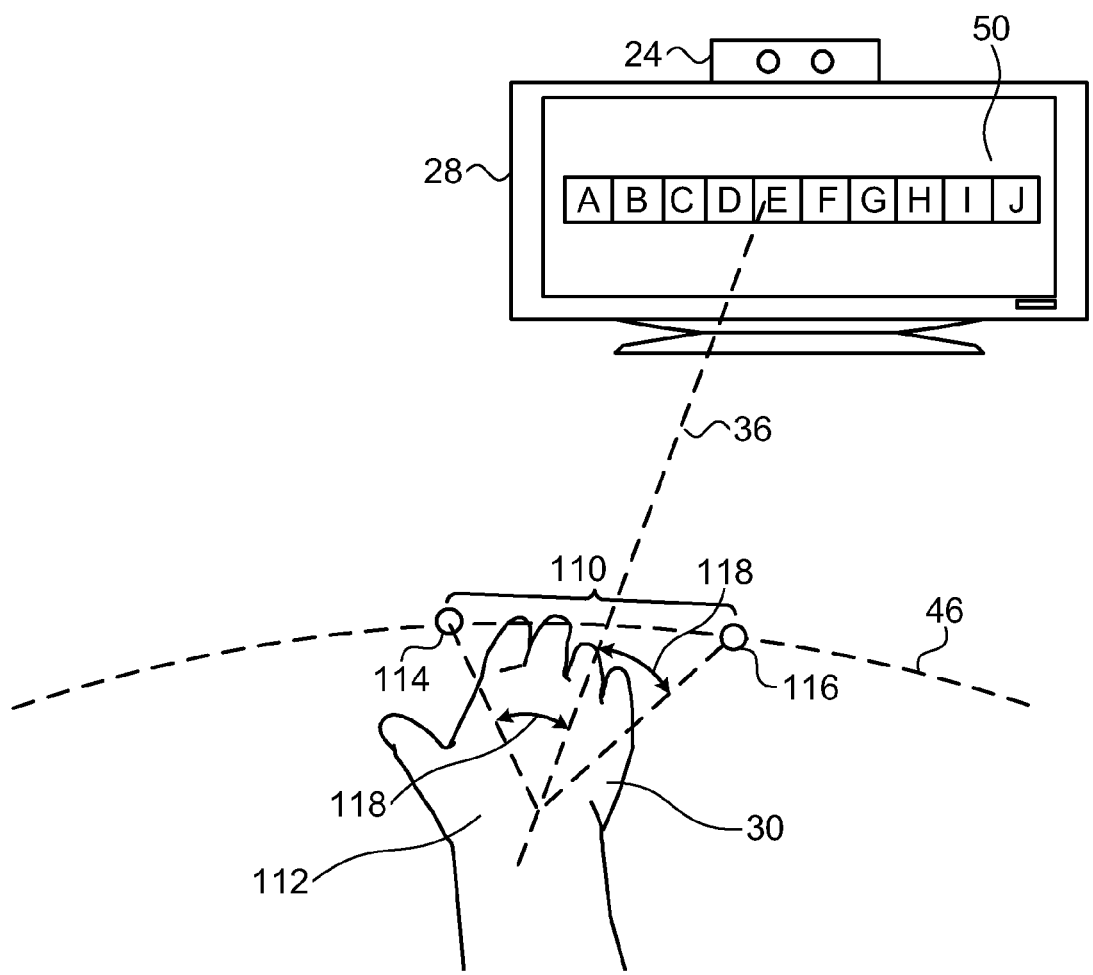
FIG. 7 is a schematic pictorial illustration of the user performing the swipe gesture, in accordance with an embodiment of the present invention.

FIG. 6 is a flow diagram that schematically illustrates a method of manipulating scrollable list 50, and FIG. 7 is a schematic pictorial illustration of user 22 performing a Swipe gesture to manipulate the scrollable list, in accordance with an embodiment of the present invention. In an initial step 90, computer 26 presents scrollable list 50 on display 28, and in a receive step 92, the computer receives, from sensing device 24, a sequence of 3D maps containing at least hand 30.

In a definition step 94, computer 26 defines a swipe region 110 that comprises a region on interaction surface 46 between a left reference point 114 and a right reference point 116. In some embodiments, computer 26 can define the left and the right reference points as locations along interaction surface 46 that are at angles 58 with respect to Z-axis 36.

In a detect step 96, computer 26 detects a Swipe gesture in which the sequence of 3D maps indicate hand 30 first engaging swipe region 110 at a first location in space, and then disengaging from the swipe region at a second region in space. To perform the Swipe gesture, user 22 can engage swipe region 110 by moving hand 30 toward display 28 and crossing the swipe region, and then moving the hand side-to-side along the swipe region. While performing a Swipe gesture, user 22 may pivot hand 30 around an associated wrist 112.

In a scrolling step 98, computer 26 initiates scrolling list 50 in response to hand 30 engaging swipe region 110. Computer 26 typically scrolls list 50 at a scrolling speed and at a direction corresponding to a speed and a direction of hand 30 performing the Swipe gesture. In other words, as user 22 moves hand 30 along swipe region 110, the hand "grasps" (i.e., directly manipulates) scrollable list 50, and computer 26 scrolls the list accordingly (i.e., left or right) at a speed indicated by the hand's speed while performing the gesture. Similarly, if user 22 stops moving hand 30 while the hand is positioned within swipe region 110, then computer 26 can stop scrolling list 50.

In a deceleration step 100, computer 26 decelerates the scrolling of list 50 upon hand 30 disengaging from swipe region 110. To disengage from swipe region 110, user 22 continues moving hand 30 along swipe region 110 past the left or the right reference points, wherein the passed reference point comprises a release point. For example, if user 22 moves hand 30 past reference point 116 while performing a left-to-right Swipe gesture, then reference point 116 comprises the release point. Likewise, if user 22 moves hand 30 past reference point 114 while performing a right-to-left Swipe gesture, then reference point 114 comprises the release point.

Upon detecting, in the maps, user 22 disengaging from swipe region 110 while performing a side-to-side Swipe gesture, computer can convey "friction-like" feedback to user 22 by scrolling list 50 at an initial scrolling speed corresponding to the speed of hand 30 as the hand moved along swipe region 110, gradually slowing down the scrolling speed, and stopping the scrolling after a specific period of time. The friction-like feedback thus simulates the behavior of the rim of a physical wheel after the wheel has been pushed, and corresponds to a slowing down of the wheel. The push starts the wheel spinning, and the rim of the wheel gradually slows down once the wheel is no longer pushed, due to friction. The rate of slow down of the physical wheel depends on the friction, and on the inertia or mass of the wheel.

As discussed supra, computer 26 can adjust the presented size of scrollable list 50 based on the scrolling speed. Therefore, if user 22 performs a fast Swipe gesture, and continues the gesture past one of the reference points, then computer 26 can initially present list 50 as shown in FIG. 3C. Assuming user 22 does not reposition hand 30 to re-engage swipe region 110, computer 26 can gradually slow down the scrolling speed and present scrollable list 50 as shown in FIG. 3B. Finally (again assuming that user 22 does not re-engage swipe region 110), computer 26 can present scrollable list 50 as shown in FIG. 3A as the computer further slows down and stops scrolling the list.

In some embodiments, the Swipe gesture may comprise user 22 positioning hand 30 along swipe region 110, performing a Grab gesture, and then moving the hand side-to-side along the swipe region. Computer 26 can stop scrolling list 50 upon detecting, in the maps, user 22 stopping hand 30 while the hand is still closed (i.e., performing the Grab gesture) and positioned within swipe region 110.

In alternative embodiments, computer 26 can convey the friction-like feedback described supra, upon detecting in the maps, user 22 positioning hand 30 on swipe region 110, performing a Grab gesture, moving hand side-to-side along the swipe region, and then performing a Release gesture. The Release gesture, described in U.S. patent application Ser. No. 13/423,314 (referenced above), comprises user relaxing hand 30 so as to open the hand from a closed or folded state. Upon detecting the Release gesture, computer 26 can convey friction-like feedback to user 22 by scrolling list 50 at an initial scrolling speed corresponding to the speed of hand 30 as the hand performs the Release gesture, then gradually slowing down the scrolling speed by applying a simulated friction model to simulate friction behavior, and eventually stopping the scrolling after a specific period of time.

Visual and Audio Feedback

While interacting with traditional two-dimensional (2D) user interfaces via physical input devices such as a keyboard, the physical input devices typically convey tactile feedback to the user. However, while interacting with a 3D user interface, the user may perform gestures without engaging any physical device, and therefore not receive any tactile feedback. Embodiments of the present invention provide methods and systems for conveying visual and/or audio feedback to the user, thereby compensating for the lack of tactile feedback.

In some embodiments, computer 26 may convey visual and/or audio feedback to user 22 upon detecting, in the maps, hand 30 engaging and disengaging from scrollable list 50 while performing a Swipe gesture. For example, user 20 can initially position hand 30 on interaction surface 46 to the left of reference point 114. As user 22 moves hand 30 along interaction surface 46 and passes reference point 114, the user starts performing a Swipe gesture, and engages scrollable list 50. Upon detecting, in the maps, user 22 engaging scrollable list 50, computer 26 can convey audio feedback (e.g., a click or a beep) and/or visual feedback (e.g., increasing the luminance and/or change the colors used to present scrollable list 50).

As described supra, user 22 can disengage from scrollable list 50 by continuing the Swipe gesture past one of the reference points. Continuing the example from the previous paragraph, upon detecting, in the maps, user 22 continuing the side-to-side motion of hand 30 past one of the reference points, computer 26 can convey audio feedback (e.g., a click or a beep) and/or visual feedback (e.g., decreasing the luminance and/or changing the colors user to present scrollable list 50).

Z-Axis Visual Feedback

Figure 8:
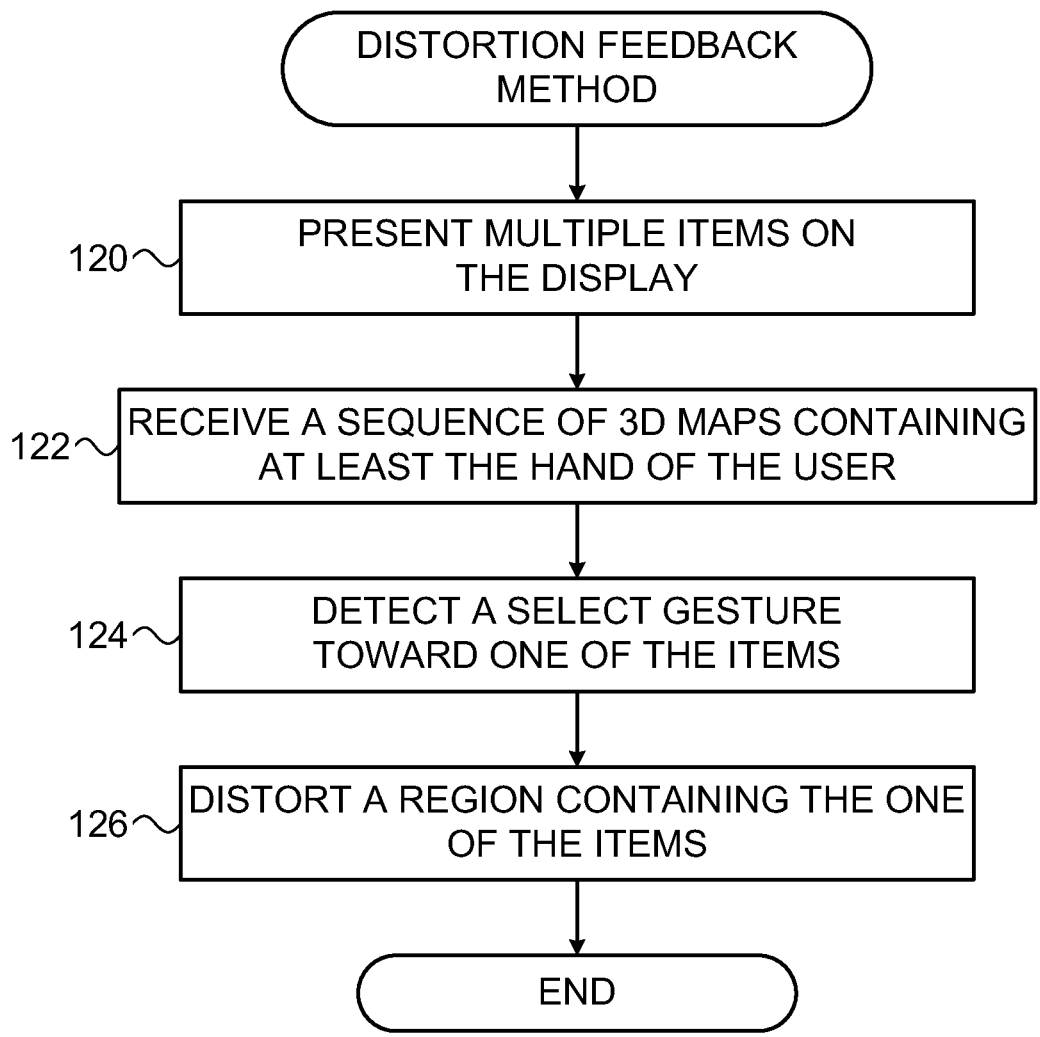
FIG. 8 is a flow diagram that schematically illustrates a method of conveying visual distortion in response to the user performing a select gesture, in accordance with an embodiment of the present invention.
Figure 9:
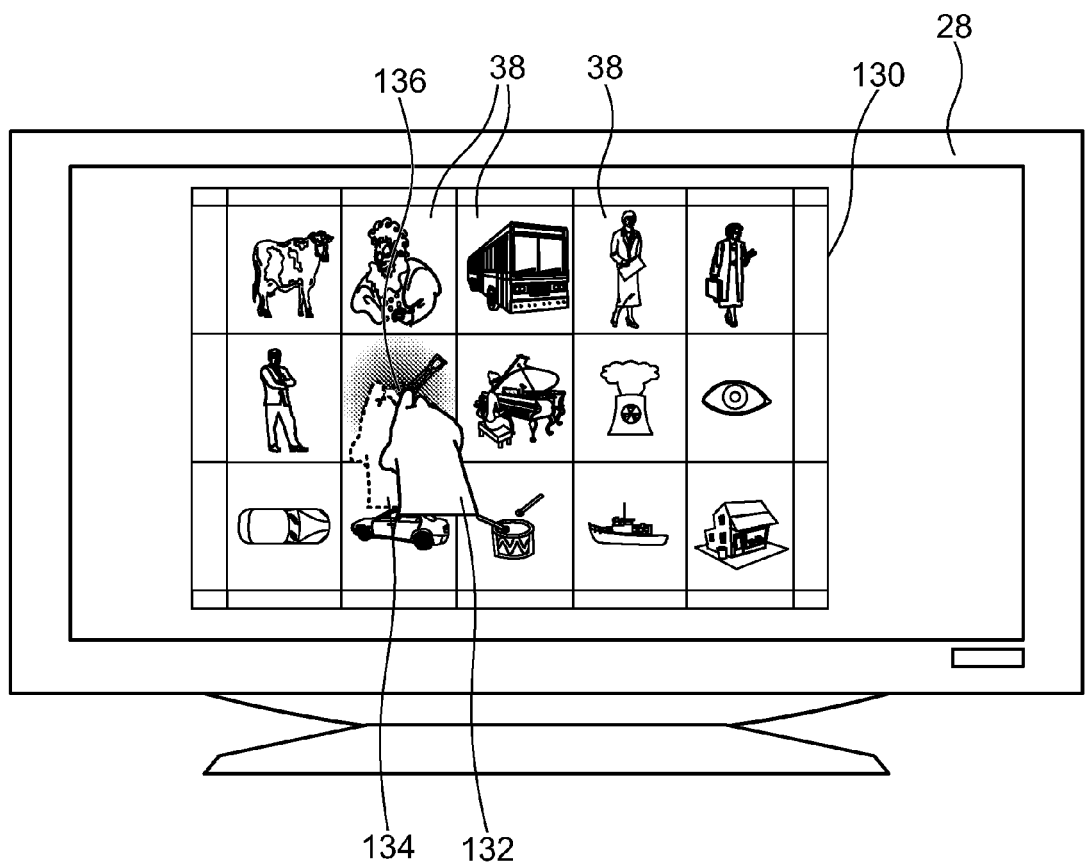
FIG. 9 is a schematic pictorial illustration of the computer presenting the distortion on the display, in accordance with an embodiment of the present invention.

FIG. 8 is a flow diagram that schematically illustrates a method of conveying visual distortion, and FIG. 9 is a schematic pictorial illustration of computer 26 conveying the distortion as a reflection and an elastic feedback on display 28, in accordance with an embodiment of the present invention. In an initial step 120, computer 26 presents multiple interactive items 38 on display 28. In the configuration shown in FIG. 9, computer 26 presents interactive items 38 as a content grid 130, wherein the interactive items may comprise media content choices.

In a receive step 122, computer 26 receives a sequence of 3D maps containing at least hand 30, and in a detect step 124, the computer detects, in the maps, a select gesture toward a given interactive item 38. A select gesture comprises a physical gesture performed by user 22 in order to select a given interactive item 38 presented on display 28. The select gesture may comprise the Touch and Grab gestures described supra.

As described supra, computer 26 can define interaction surface 46 in proximity to user 22. In some embodiments, computer 26 may detect, in the 3D maps, a transverse motion of hand 30 (i.e., along X-Y plane 40), and position a hand cursor 132 on display 28 in response to the transverse motion. Additionally, computer 26 may present a "reflection" 134 slightly offset (i.e., horizontally and/or vertically) from hand cursor 132, by considering surface 46 as a "mirror." Upon detecting user 22 moving hand 30 forward along Z-axis 36, computer 26 can present hand cursor 132 converging with reflection 134, and upon the hand reaching interaction surface 46 (the mirror), the hand cursor and the reflection "meet". In other words, the offset between hand cursor 132 and reflection 134 can be directly proportional to a distance between hand 30 and interaction surface 46.

Additional visual effects that computer 26 can convey when presenting hand cursor 132 and reflection 134 include:

Upon detecting user 22 performing a Find gesture, the computer can present hand cursor 132 and reflection 134 at an initial small size. As user 22 moves hand 30 forward along Z-axis 36 towards interaction surface 46, computer 26 may increase the size of the hand cursor and the reflection. In other words, the size of hand cursor 132 and reflection 134 can be inversely proportional to the distance between hand 30 and interaction surface 46.

Upon detecting user 22 moving hand 30 away from interaction surface 46, computer 26 can decrease the intensity of reflection 134 (i.e., "fading" the reflection away), and as the user moves the hand closer to the interaction surface, the computer can increase the intensity of the reflection.

Upon detecting user 22 moving hand 30 away from interaction surface 46, computer 26 can blur reflection 134, and as the user moves the hand closer to the interaction surface, the computer can sharpen the reflection.

Returning to the flow diagram, in a distort step 126, computer 26 can distort a region 136 on display 28 that contains the given interactive item, and the method ends. In some embodiments, computer 26 may distort content region 136 when the sequence of 3D maps indicate that hand 30 reached and/or moved forward past interaction surface 46. In some embodiments, computer 26 may create a distortion in the content choice on content grid 110 where hand cursor 132 is positioned. Computer 26 can present the distortion as an "elastic-like" effect, where it appears that hand cursor 132 is pushing against a flexible surface, thereby creating a recessed vertex.

It will be appreciated that the embodiments described above are cited by way of example, and that the present invention is not limited to what has been particularly shown and described hereinabove. Rather, the scope of the present invention includes both combinations and subcombinations of the various features, including the transformations and the manipulations, described hereinabove, as well as variations and modifications thereof which would occur to persons skilled in the art upon reading the foregoing description and which are not disclosed in the prior art.

I claim:

1. A method, comprising:
   presenting, by a computer, multiple interactive items on a display driven by the computer;

receiving, from a depth sensor, a sequence of three-dimensional (3D) maps containing at least a hand of a user of the computer;

defining an interaction surface in space in proximity to the user;

detecting in the maps a transverse motion of the hand in space, and positioning, on the display, a cursor in response to the transverse motion;

detecting, in the maps, a select gesture performed by the hand and directed toward one of the multiple interactive items while the hand engages the interaction surface; and distorting a region on the display containing the one of the multiple interactive items in response to the select gesture and engagement of the interaction surface by the hand, by presenting the region surrounding the cursor as a recessed vertex.

2. The method according to claim 1, wherein the select gesture comprises the user moving the hand toward the one of the interactive items.

3. The method according to claim 1, and comprising detecting, in the maps a transverse motion of the hand, and positioning, on the display, a cursor in response to a transverse motion of the hand.

4. The method according to claim 1, and comprising presenting, on the display, a reflection of the cursor at an offset directly proportional to a distance between the hand and the interaction surface.

5. The method according to claim 4, and comprising presenting the reflection at a size inversely proportional to the distance between the hand and the interaction surface.

6. An apparatus, comprising:

a depth sensor; and a computer configured to present multiple interactive items on a display driven by the computer, to receive, from the depth sensor, a sequence of three-dimensional (3D) maps containing at least a hand of a user of the computer, to define an interaction surface in space in proximity to the user, to detect in the maps a transverse motion of the hand in space, and to position, on the display, a cursor in response to the transverse motion, to detect, in the maps, a select gesture performed by the hand and directed toward one of the multiple interactive items while the hand engages the interaction surface, and to distort a region on the display containing the one of the multiple interactive items in response to the select gesture and engagement of the interaction surface by the hand, by presenting the region surrounding the cursor as a recessed vertex.

7. The apparatus according to claim 6, wherein the select gesture comprises the user moving the hand toward the one of the interactive items.

8. The apparatus according to claim 6, wherein the computer is configured to detect, in the maps a transverse motion of the hand, and to position, on the display, a cursor in response to a transverse motion of the hand.

9. The apparatus according to claim 6, wherein the computer is configured to present, on the display, a reflection of the cursor at an offset directly proportional to a distance between the hand and the interaction surface.

10. The apparatus according to claim 9, wherein the computer is configured to present the reflection at a size inversely proportional to the distance between the hand and the interaction surface.

11. A computer software product comprising a non-transitory computer-readable medium, in which program instructions are stored, which instructions, when read by a computer executing a non-tactile user interface, cause the computer to present a scrollable list of items on a display driven by the computer, to receive, from a depth sensor, a sequence of three-dimensional (3D) maps containing at least a hand of a user of the computer, to define an interaction surface in space in proximity to the user, to detect in the maps a transverse motion of the hand in space, and to position, on the display, a cursor in response to the transverse motion, to detect, in the maps, a select gesture performed by the hand and directed toward one of the multiple interactive items while the hand engages the interaction surface, and to distort a region on the display containing the one of the multiple interactive items in response to the select gesture and engagement of the interaction surface by the hand, by presenting the region surrounding the cursor as a recessed vertex.

* * * * *